3,057,800
POLYMERIC PHENATE SALT AND LUBRICANT
CONTAINING SAME
Joseph A. Verdol, Dolton, Ill., assignor, by mesne assignments, to Sinclair Research, Inc., New York, N.Y., a corporation of Delaware
No Drawing. Filed Oct. 26, 1959, Ser. No. 848,534
7 Claims. (Cl. 252—42.7)

This invention is drawn to a novel polymeric phenate and to a novel lubricant containing it. Such a lubricant is given improved oxidation resistance and/or detergency properties by the phenate.

The phenate has the general formula:

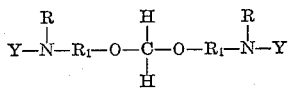

where Y is

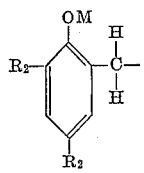

R is hydrogen, a lower alkyl (1–4 carbon atoms) or Y; $R_1$ is a divalent aliphatic hydrocarbon radical of 2 to 6 carbons; $R_2$ is hydrogen or alkyl sufficient to give oil solubility, that is, an alkyl of 4 to 12 carbon atoms and at least one $R_2$ on each Y group is alkyl and M represents half an atom of an alkaline earth metal.

The general class of compounds comprising this invention can be prepared, for example, by condensing ortho and/or para substituted phenols with formaldehyde as shown in the equations below and an amino alcohol:

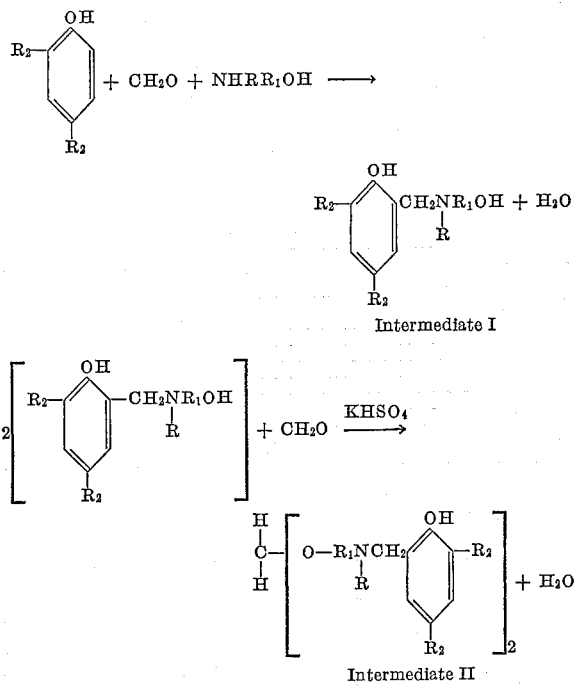

This product is readily converted to the desired metallic derivative (usually of an alkaline earth metal such as calcium, barium or magnesium) by reaction of the phenolic hydroxy groups with the appropriate metallic oxides or hydroxides. The product need not be fully neutral but generally is essentially neutral.

The aromatic reactant may be any mono or di-substituted phenol of 10 to 30 carbon atoms, having at least one free ortho or para position. Preferably one $R_2$ group is hydrogen while the other $R_2$ substituent is a hydrocarbon group. Starting materials such as 2,6-ditertiarybutyl phenol, para-tertiaryoctyl phenol, 2,4-ditertiaryamyl phenol, etc., are readily available. In place of formaldehyde, other aldehydes may be employed, however, acetaldehyde and formaldehyde are the most desirable, with formaldehyde being the preferred aldehyde. In the examples below, both formalin and paraformaldehyde were employed. Any form of formaldehyde can be used, preferably paraformaldehyde and formalin solutions in water.

Ethanolamine or an N-substituted ethanolamine can be employed in the reaction, but the amine must have at least 1 free hydrogen atom on the nitrogen atom of the molecule. For example, ethanolamine, N-ethylaminoethanol, N-butylaminoethanol, N-phenylaminoethanol, etc., can be used. The structure of the ethanol amines should conform to the following:

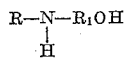

in which R can be hydrogen or alkyl as described above and may contain halogen, nitro, keto, acyl, aryl, etc. functions as part of the R grouping.

Where the R group of the ethanolamine is hydrogen, that is, where a primary ethanolamine is used as the starting material, the phenate produced frequently contains as the R group the

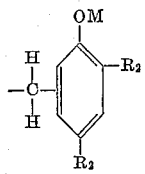

residue of the substituted phenol and aldehyde.

The novel phenate of the invention is produced by reacting the aldehyde with a mixture of equivalent amounts of ethanolamine and the substituted phenol. The aldehyde and amine may be present in excess to promote complete reaction. This mixing can be done at any temperature from room temperature to about 100° C. with a temperature of about 40–70° C. being preferred. When an N-substituted ethanolamine is used, one mole of the ethanolamine and one mole of the substituted phenol is reacted with the aldehyde; where a primary ethanolamine is used, one mole of the ethanolamine reacts with two moles of the substituted phenol and two moles of the aldehyde. Either of these reactant ratios gives one mole of the intermediate I reported above. After pre-mixing the ethanolamine and phenol, the formaldehyde is added at room temperature to about 150° C. with the preferred range being from about 40 to 70° C. Heat is applied and mixing is continued until the reaction ceases, as indicated by a lack of further water formation.

The reaction of one mole of aldehyde with two moles of intermediate I results in coupling of the free —OH groups from the ethanolamine to methylene ether bridge structures of the type —O—CH$_2$—O—. The second portion of formaldehyde is added at about the same temperature as described above, preferably in the presence of an acidic catalyst, such as potassium hydrogen sulfate. An inert solvent such as toluene or xylene may be employed in conducting this reaction.

The resulting intermediate II product is converted to its calcium, magnesium or barium phenate by reaction with an appropriate alkaline earth metal component, generally the metal oxide or hydroxide, preferably while the intermediate is dissolved in its solvent. Alternatively the intermediate II may be isolated from the reaction mixture and redissolved, suitably in a portion of the lubricating oil in which it is to serve as an additive. The metal component is reacted at a temperature up to about 150° C. until water ceases to be removed. Higher temperatures could be used but no purpose in doing so has been found. In order to obtain a sufficient amount of, for example, calcium, in the condensation product it is desirable to employ at least 1 mole of lime (calculated as calcium oxide) per mole of alkyl phenol employed in the reaction. It is possible to use a large excess of lime without altering the structure of the desired product.

The calcium salt of the condensation product derived from ethanolamine, octylphenol, and formaldehyde was very effective in improving the stability of lubricating oils. In particular, Railroad Oxidation tests showed that oil blends containing this additive were very effective in maintaining a high pH during the course of the test. The additive also appeared to be effective in controlling viscosity rise, sludge formation, bearing corrosion and acid number.

The oil base stock which is given improved oxidation resistance by the inclusion of the novel phenate of the invention is of lubricating viscosity and can be for instance a solvent extracted or solvent refined mineral oil obtained in accordance with conventional methods of solvent refining lubricating oils. Generally, lubricating oils have viscosities from about 20 to 250 SUS at 210° F. The base oil may be derived from paraffinic, naphthenic, asphaltic or mixed base crudes, and if desired, a blend of solvent-treated Mid-Continent neutrals and Mid-Continent bright stocks may be employed. A particularly suitable base oil is a solvent-treated Mid-Continent neutral having a viscosity of 150 SUS at 100° F. and a viscosity index of about 95. Synthetic lubricants may also be improved by the presence of the novel inhibitor of this invention. Such synthetic lubricants include simple and complex esters of long chain fatty acids with alcohols and glycols, esters of dibasic acids such as di-(2-ethylhexyl) sebacate, adipate and the like, polymerized cracked wax, polyglycol esters, polyglycol ethers, polyglycol ether esters, etc.

The novel phenates of this invention may be blended with the base oil in amounts to provide a metal content ranging from about 0.01 to 1%, preferably about 0.05 to 0.5% metal by weight of the lubricant. Other materials normally incorporated in lube oils to impart special characteristics can be added to the lubricant compositions of this invention. These include corrosion inhibitors, anti-wear agents, etc. The amount of these additives included in the composition usually ranges from about 0.01 weight percent up to about 10 weight percent, although some multi-purpose oils used to lubricate gears require a combination of extreme pressure additives amounting to about 5 to 20% of the total weight of the lubricant, usually about 8–13%.

The following examples of a preferred embodiment of this invention are illustrative only and are not to be construed as limiting.

A phenate was prepared from para-tertiaryoctyl phenol, formalin, ethanolamine, paraformaldehyde and lime, according to the procedure given below. The products conform to above illustration where one $R_2$ is hydrogen and the other $R_2$ is tertiaryoctyl, $R_1$ is ethylene, R is a para-tertiaryoctyl Y group and M is calcium.

Two moles of para-tertiaryoctyl phenol and 1 mole of ethanolamine were added to a 2-liter, 3-necked flask, equipped with a stirrer, thermometer, heating mantle, reflux condenser and water trap. The mixture was heated to 70° C. and 170.5 gms. of formalin (2 moles ca. 37%) added to the mixture over a period of 20 minutes. The temperature was then increased slowly until the mixture reached a temperature of about 160° C. Heating was continued until no more water was given off from the reaction mixture. The total heating time was about two hours.

The mixture from this first step was cooled to room temperature and 700 ml. of toluene was added to the reaction flask, followed by the addition of 20 gms. of potassium hydrogen sulfate and 16 gms. (0.5 mole) of paraformaldehyde. The mixture was heated under reflux until all of the toluene-water azeotrope was removed. A total of 7.6 ml. of water was collected. The toluene solution was then filtered to remove the potassium hydogen sulfate and the toluene distilled from the reaction mixture. After removal of the toluene, a hard, brittle, amber colored resin was obtained, weighing 490 gms.

The infrared spectrum of this product showed no evidence of free aliphatic hydroxyl groups, suggesting that the ethanolamine hydroxyl groups of intermediate I were linked with a methylene bridge. The infrared spectrum also showed evidence for an aliphatic ether linkage, which further suggested that the principal products of the reaction were those in which the aliphatic hydroxyls were linked by reaction with formaldehyde.

A portion of the above resin (216.5 gms.) was dissolved in 433 gms. of a solvent refined neutral distillate having a viscosity of 150 SUS at 100° F. and a viscosity index of 95. 2 moles of hydrated lime and 100 ml. of water were added to the mixture. The mixture was then heated slowly, with stirring, over a three hour period, until dehydration was complete. Analysis of the filtered product showed the following:

| | |
|---|---|
| Percent Ca | 1.85 |
| Percent N | 0.71 |
| Acid No. pH 11 | 0.57 |
| Base No. pH 4 | 63.9 |
| Initial pH | 8.8 |

Portions of the above calcium salt were blended in further portions of the base oil described above to calcium levels of 0.085 and 0.17%. The blends were then submitted for tests. The results of these tests are summarized in Table I. The test is one of oxidation characteristics of railway diesel lubricants (Railroad Oxidation Test) wherein five liters of oxygen per hour are bubbled through a 300 ml. sample of the lubricant in the presence of a steel-backed copper-lead catalyst.

TABLE I

*Railroad Oxidation Tests*

| Sample No. | A | B | C |
|---|---|---|---|
| Calcium level, percent | 0.17 | 0.085 | (1) |
| Acid No.: | | | |
| 48 Hours | 0.36 | 0.23 | |
| 96 Hours | 0.55 | 0.29 | |
| 144 Hours | 0.54 | 1.00 | 3.03 |
| Percent Vis. Increase | 1 | 1.66 | 21 |
| Initial pH | 8.2 | 7.2 | 5.2 |
| Pentane Insol | 1.38 | .406 | .953 |
| Cat. wt. loss, mg | 6.5 | 27.7 | 116 |
| Appearance of Bubbler and Tube | (2) | clean | (3) |

[1] No additive.
[2] Lt. sludge and varnish.
[3] Medium sludge and varnish.

The data presented in Table I show that the phenate additive of this invention was effective in improving the oxidation characteristics of the base oil. The additive also was effective in maintaining a high pH during the course of the oxidation test. The additive also was effective in controlling viscosity rise and acid number due to oxidation of the oil. The copper-lead catalyst corrosion loss was also markedly mitigated by the additive.

I claim:
1. An alkaline earth metal salt of

$$YNRR_1OCH_2OR_1RNY$$

where Y is

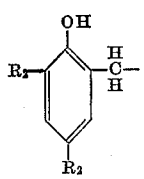

R is selected from the group consisting of hydrogen, lower alkyl and Y; $R_1$ is a divalent aliphatic hydrocarbon radical of 2 to 6 carbon atoms; and $R_2$ is selected from the group consisting of hydrogen and alkyl groups of 4 to 12 carbon atoms with the provisos that at least one $R_2$ group of each Y group is alkyl and that the total carbon atoms in the $R_2$ groups is sufficient to give oil-solubility to the compound.

2. The calcium salt of

where Y is

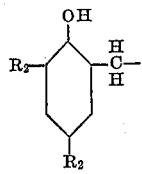

$R_1$ is a divalent aliphatic hydrocarbon radical of 2 to 6 carbon atoms, one $R_2$ group is hydrogen and the other $R_2$ group is tertiaryoctyl.

3. An alkaline earth metal salt of

where Y is

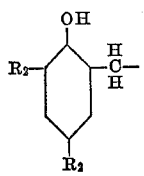

R is selected from the group consisting of hydrogen, alkyl of 1-4 carbon atoms and Y; $R_1$ is a divalent aliphatic hydrocarbon radical of 2 to 6 carbon atoms; and $R_2$ is selected from the group consisting of hydrogen and alkyl groups of 4 to 12 carbon atoms with the proviso that at least one $R_2$ group of each Y group is alkyl and that the total carbon atoms in the $R_2$ groups is sufficient to give oil-solubility to the compound.

4. A lubricant composition of improved oxidation resistance consisting essentially of an amount of the calcium salt of

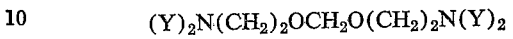

where Y is

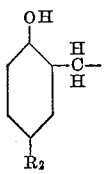

and $R_2$ is tertiaryoctyl, sufficient to supply a calcium content of about 0.05 to 0.5% in a mineral oil base of lubricating viscosity.

5. A lubricant composition of improved oxidation resistance consisting essentially of a small amount, effective to improve the oxidation resistance of the lubricant of the compound of claim 1 in an oil base of lubricating viscosity.

6. A lubricant composition of improved oxidation resistance consisting essentially of an amount of the compound of claim 1 sufficient to supply a metal content of about 0.05 to 0.5% in a mineral oil base of lubricating viscosity.

7. A lubricant composition of improved oxidation resistance consisting essentially of a small amount, effective to improve the oxidation resistance of the lubricant of the compound of claim 3 in an oil base of lubricating viscosity.

References Cited in the file of this patent

UNITED STATES PATENTS

| | | |
|---|---|---|
| 2,353,192 | Sargent et al. | July 11, 1944 |
| 2,353,491 | Oberright | July 11, 1944 |
| 2,459,114 | Oberright | Jan. 11, 1949 |

UNITED STATES PATENT OFFICE
CERTIFICATE OF CORRECTION

Patent No. 3,057,800            October 9, 1962

Joseph A. Verdol

It is hereby certified that error appears in the above numbered patent requiring correction and that the said Letters Patent should read as corrected below.

Column 5, lines 21 to 27, and lines 35 to 41, the formula, each occurrence, should appear as shown below instead of as in the patent:

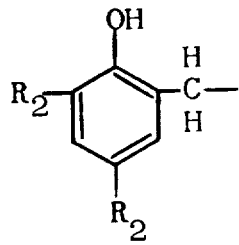

column 6, lines 12 to 19, the formula should appear as shown below instead of as in the patent:

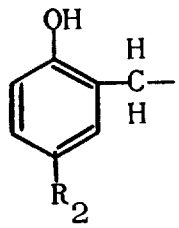

Signed and sealed this 12th day of November 1963.

(SEAL)
Attest:
ERNEST W. SWIDER
Attesting Officer

EDWIN L. REYNOLDS
Acting Commissioner of Patents